(12) United States Patent (10) Patent No.: US 8,620,998 B2
Hajost (45) Date of Patent: Dec. 31, 2013

(54) MOBILE APPLICATION DEPLOYMENT FOR DISTRIBUTED COMPUTING ENVIRONMENTS

(75) Inventor: Brian H. Hajost, Great Falls, VA (US)

(73) Assignee: SteelCloud, Inc., Ashburn, VA (US)

( * ) Notice: Subject to any disclaimer, the term of this patent is extended or adjusted under 35 U.S.C. 154(b) by 266 days.

(21) Appl. No.: 12/880,072

(22) Filed: Sep. 11, 2010

(65) Prior Publication Data

US 2012/0066287 A1    Mar. 15, 2012

(51) Int. Cl.
*G06F 15/16*    (2006.01)

(52) U.S. Cl.
USPC ............ 709/203; 709/217; 709/219; 709/223

(58) Field of Classification Search
USPC .................................. 709/203, 217, 219, 223
See application file for complete search history.

(56) References Cited

U.S. PATENT DOCUMENTS

| | | | |
|---|---|---|---|
| 6,345,386 B1 * | 2/2002 | Delo et al. ..................... | 717/176 |
| 6,529,938 B1 * | 3/2003 | Cochran et al. ................ | 709/203 |
| 7,751,809 B2 * | 7/2010 | Owen et al. ..................... | 455/418 |
| 2002/0007410 A1 * | 1/2002 | Seagren et al. ................. | 709/227 |
| 2004/0098419 A1 * | 5/2004 | Bantz et al. ..................... | 707/203 |
| 2004/0205749 A1 * | 10/2004 | Dalton et al. ................... | 717/178 |
| 2006/0136928 A1 * | 6/2006 | Crawford et al. ............... | 718/105 |
| 2007/0088755 A1 * | 4/2007 | Nesbitt et al. .................. | 707/200 |
| 2007/0275725 A1 * | 11/2007 | Tsunehara ....................... | 455/436 |
| 2007/0282983 A1 * | 12/2007 | Gujarathi et al. ............... | 709/223 |
| 2007/0288989 A1 * | 12/2007 | Aarnos et al. ...................... | 726/1 |
| 2008/0052383 A1 * | 2/2008 | O'Shaughnessy et al. ... | 709/223 |
| 2008/0160958 A1 * | 7/2008 | Abichandani et al. ......... | 455/410 |
| 2009/0019515 A1 * | 1/2009 | Excoffier et al. .................. | 726/1 |
| 2009/0288077 A1 * | 11/2009 | Miranda-Steiner et al. .. | 717/173 |
| 2010/0087181 A1 * | 4/2010 | Chen et al. ...................... | 455/418 |
| 2010/0087184 A1 * | 4/2010 | Stoev et al. .................. | 455/422.1 |
| 2010/0088367 A1 * | 4/2010 | Brown et al. .................. | 709/203 |
| 2010/0106697 A1 * | 4/2010 | Enoki et al. ..................... | 707/704 |
| 2010/0262619 A1 * | 10/2010 | Zargahi et al. ................ | 707/770 |
| 2010/0262958 A1 * | 10/2010 | Clinton et al. ................. | 717/171 |
| 2010/0299152 A1 * | 11/2010 | Batchu et al. ................... | 705/1.1 |
| 2011/0197254 A1 * | 8/2011 | Sallaka et al. ...................... | 726/1 |
| 2012/0005283 A1 * | 1/2012 | Provo et al. .................... | 709/206 |
| 2012/0023077 A1 * | 1/2012 | Kann et al. ..................... | 707/702 |
| 2012/0110345 A1 * | 5/2012 | Pigeon et al. .................. | 713/189 |
| 2012/0117181 A1 * | 5/2012 | Patel et al. ..................... | 709/217 |
| 2012/0195325 A1 * | 8/2012 | Connelly et al. .............. | 370/432 |
| 2012/0239522 A1 * | 9/2012 | Swanson ....................... | 705/26.5 |

\* cited by examiner

*Primary Examiner* — Anthony Mejia
(74) *Attorney, Agent, or Firm* — Steven M. Greenberg, Esq.; Carey, Rodriguez, Greenberg & O'Keefe, LLP

(57) ABSTRACT

Embodiments of the present invention provide a method, system and computer program product for mobile application deployment in a distributed computing environment. In an embodiment of the invention, a method for mobile application deployment in a distributed computing environment is provided. The method includes uploading a mobile application into a secured central mobile application repository and modifying a distribution policy for other mobile applications in the secured central mobile application repository to account for the uploaded mobile application and changes within the distribution policy. Thereafter, both the distribution policy and the uploaded mobile application can be transmitted to a distributed application repository by way of an intermediate server coupled to a secured distributed application repository. The intermediate server is charged with synchronizing messages, calendaring and contacts with wirelessly linked pervasive mobile devices and an associated messaging server. Finally, the intermediate server selectively deploys the uploaded mobile application to different coupled mobile devices from the distributed application repository according to the distribution policy.

5 Claims, 2 Drawing Sheets

MOBILE APPLICATION DEPLOYMENT FOR DISTRIBUTED COMPUTING ENVIRONMENTS

BACKGROUND OF THE INVENTION

1. Field of the Invention

The present invention relates to computer program deployment and more particularly to mobile application deployment to pervasive computing devices in a distributed computing environment.

2. Description of the Related Art

Integral to the successful implementation of a computer software development project is the ultimate deployment of a fully functioning computing system. Early forms of computing systems involved a single computer program executing in the memory of a single computer. The rise of computer network in general industry resulted in expansion of the traditional computing system from the single computer to a client-server architected computing system in which many different computing clients, individually executing a computer program access program data through one or more coupled host servers. The explosion of Internet computing has further complicated matters resulting in complex computing arrangements in which logic for a computing system resides and executes across a multiplicity of end user computing devices and remote servers.

The accessibility of the Internet has facilitated the growth and popularity of distributed computing models. In a distributed computing model, substantial processing can be pushed to host servers geographically closest to the end user. One or more controllers determine when program logic or data is best served from a particular remote server for the benefit of a particular end user or class of end users. Given the complexity of the distributed computing architecture, deploying an application into a distributed architecture can be equally as complicated—particularly where access policies determine whether or not an individual end user or class of end users are permitted to deploy a given application onto a given computing device.

The problem of application deployment into a distributed computing environment is most prevalent in a distributed computing environment supporting a multiplicity of pervasive end user mobile devices such personal digital assistants and smart phones. At present, the most popular methodology for application deployment to pervasive devices mimics the ad hoc distribution model. In the ad hoc distribution model, individual end users connect to a remote server providing a menu of applications available for deployment over the Internet to respective pervasive mobile devices. Thus, the process is one of a direct communication between a requesting pervasive mobile device and application repository.

Distributed computing environments, including those that support pervasive mobile devices, prefer functionality to manage the number, type and nature of applications able to be deployed to a particular individual or class of individuals. The ad hoc distribution model, thus, is not compatible with structure of a distributed computing environment to the extent that a distributed computing environment can include a selection of distributed hosts, each with its own application repository servicing a set of pervasive mobile devices. Thus, unlike the simplistic model of ad hoc application distribution for a single host distributing mobile applications to a multiplicity of pervasive mobile devices in which centralized control over access rights to the applications can be asserted, the ad hoc distribution model in a distributed computing environment requires substantial and tedious manual management by an administrator ensuring the access rights to mobile applications to different users or classes of users are enforced at each remote host.

BRIEF SUMMARY OF THE INVENTION

Embodiments of the present invention address deficiencies of the art in respect to mobile application deployment to pervasive mobile devices and provide a novel and non-obvious method, system and computer program product for mobile application deployment in a distributed computing environment. In an embodiment of the invention, a method for mobile application deployment in a distributed computing environment is provided. The method includes uploading a mobile application into a secured central mobile application repository and modifying a distribution policy for other mobile applications in the secured central mobile application repository to account for the uploaded mobile application and changes within the distribution policy. Thereafter, both the distribution policy and the uploaded mobile application can be transmitted to a distributed application repository by way of an intermediate server coupled to the secured distributed application repository. The intermediate server is charged with synchronizing messages, calendaring and contacts with wirelessly linked pervasive mobile devices and an associated messaging server. Finally, the intermediate server selectively deploys the uploaded mobile application to different coupled mobile devices from the distributed application repository according to the distribution policy.

In another embodiment of the invention, a mobile application deployment data processing system is provided. The system includes different intermediate servers each separately programmed to synchronize messages, calendaring and contacts between wirelessly linked pervasive mobile devices and an associated messaging server. The system also includes different distributed mobile application repositories, each coupled to a different one of the intermediate servers. The system yet further includes a secure mobile application repository storing multiple different mobile applications and coupled to the distributed mobile application repositories over a computer communications network. Finally, the system includes auto-synchronization logic executing in memory of a computer coupled to the secure mobile application repository. The logic includes program code enabled to transmit in response to detecting a change in a distribution policy for the mobile applications, both the distribution policy and an uploaded mobile application to the distributed application repositories by way of the intermediate severs, wherein the change accounts for uploaded at least one or more of the multiple different mobile applications to the secure mobile application repository and the changes within the distribution policy.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for mobile application deployment in a distributed computing environment. In accordance with an embodiment of the invention, a mobile application for use in a pervasive mobile device can be uploaded to a mobile application repository and a distribution policy for different end users of mobile applications can be modified to account for the uploaded mobile application. Thereafter, the mobile application and the distribution policy can be transmitted to different distributed mobile application repositories communicatively coupled to different pervasive mobile devices for corresponding ones of the different end users through respectively different middleware enterprise servers providing messaging, contact and calendaring synchronization between the pervasive mobile devices and corresponding messaging servers. Finally, the mobile application can be deployed onto selected ones of the mobile devices from the distributed mobile application repositories only as permitted by the distribution policy disposed in the distributed mobile application repositories.

Figure 1:
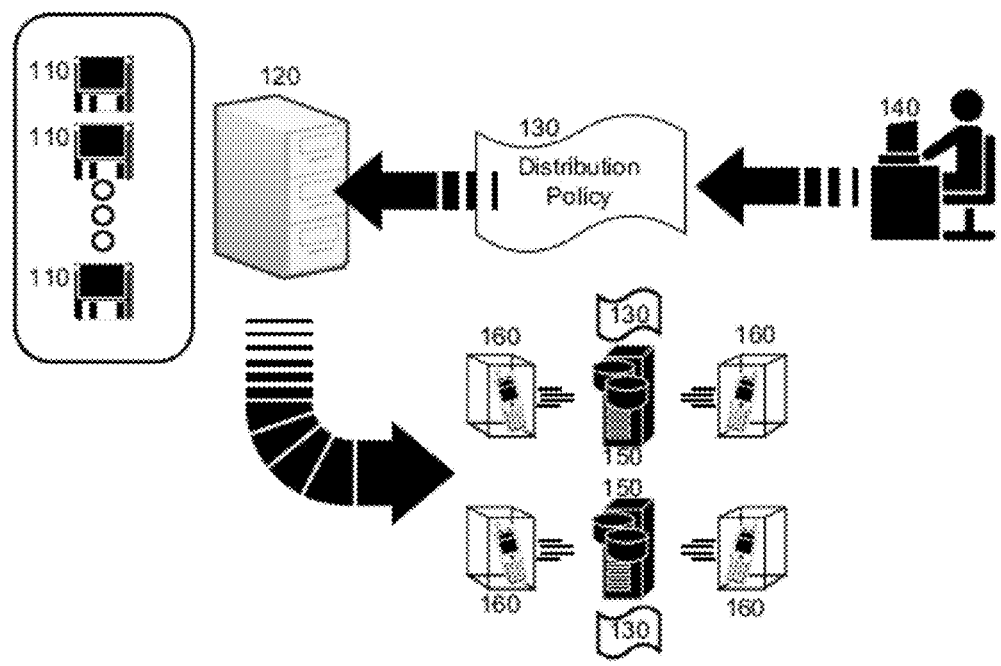
FIG. 1 is a pictorial illustration of a process for mobile application deployment in a distributed computing environment.

In further illustration, FIG. 1 is a pictorial illustration of a process for mobile application deployment in a distributed computing environment. As shown in FIG. 1, different mobile applications 110 can be uploaded to and stored in a secure central repository 120 disposed behind a firewall in a computer communications network. A distribution policy 130 can be centrally maintained by an administrator 140 in connection with the mobile applications 110 stored in the secure central repository 120. Specifically, the distribution policy 130 can specify criteria requisite to permit or deny access to the different mobile applications 110 when deploying the different mobile applications 110 to respectively different pervasive mobile devices 160.

Of note, the mobile applications 110 can be deployed to the respectively different pervasive mobile device 160 in a distributed computing environment. In the distributed computing environment, distributed mobile application repositories 150 can be coupled to different groupings of the pervasive mobile devices 160. As such, end users of the pervasive mobile devices 160 can request deployment of a selected one of the mobile applications 110 not from the secure central repository 120, but from a coupled one of the distributed mobile application repositories 150 by way of an intermediate server charged with synchronizing messages, calendaring and contacts between the pervasive mobile devices and an associated messaging server.

However, the deployment of a selected one of the mobile applications 110 can be limited according to terms of the distribution policy 130 managed centrally by the administrator 140 and distributed to each of the distributed mobile application repositories 150. In this way, the integrity and validity of mobile applications 110 uploaded into the secure central repository 120 can be assured while limiting access to both the mobile applications 110 and the distribution policy 130 behind the firewall and while permitting scalability afforded by the distributed computing environment without requiring a tedious, manual maintenance of the distribution policy 130 at each of the distributed application repositories 150.

Figure 2:
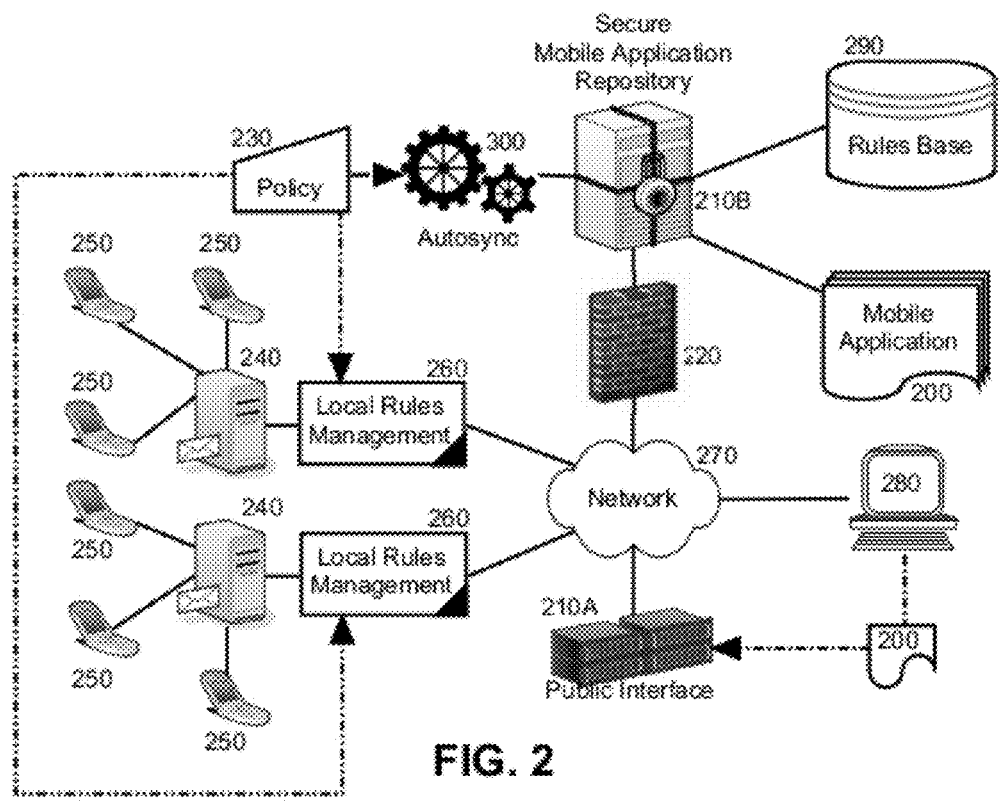
FIG. 2 is a schematic illustration of a mobile application deployment data processing system configured for mobile application deployment in a distributed computing environment; and, FIG. 3 is a flow chart illustrating a process for mobile application deployment in a distributed computing environment.

The process described in connection with FIG. 1 can be implemented within a mobile application deployment data processing system. In further illustration, FIG. 2 schematically depicts a mobile application deployment data processing system configured for mobile application deployment in a distributed computing environment. The system can include a secure mobile application repository 210B storing different mobile applications 200. The secure mobile application repository 210B can be coupled over computer communications network 270 to multiple different distributed application repositories disposed in or coupled to correspondingly different intermediate servers 240 charged with synchronizing messages, calendaring and contacts with wirelessly linked pervasive mobile devices 250 and an associated messaging server (not shown).

Notably, the secure mobile application repository 210B can be disposed behind a firewall 220 so as to limit access to the secure mobile application repository 210B from over the computer communications network 270. In this regard, an interface 210A to the secure mobile application repository 210B can be provided and rendered accessible to a communicatively coupled terminal 280. The interface 210A can publish a catalog of the mobile applications 200 in the secure mobile application repository 210B. Further, the interface 210A can provide a user interface through which the mobile applications 200 can be uploaded to the secure mobile application repository 210B. The interface 210A also can provide a user interface through which deployment rules limiting deployment of the mobile applications 200 can be created, modified and deleted in a rules base 290 and aggregated into a distribution policy 230.

In accordance with an embodiment of the invention, auto-synchronization logic 300 can be coupled to the secure mobile application repository 210B and can execute in memory by at least one processor of a computer. The auto-synchronization logic 300 can detect changes to the distribution policy 230 and can forward copies of the distribution policy 230 to different ones of the distributed application repositories disposed in or coupled to correspondingly different intermediate servers 240. As an alternative or in supplement, the auto-synchronization logic 300 can detect changes to the secure mobile application repository 210B and can forward copies of the distribution policy 230 to different ones of the distributed application repositories disposed in or coupled to correspondingly different intermediate servers 240. In either circumstance, a local rules management module 260 for each of the different distributed application repositories can process the distribution policy 230 to determine which of coupled pervasive mobile devices 250 are to receive selected ones of the mobile applications 200 deployed to the different distributed application repositories.

Figure 3:
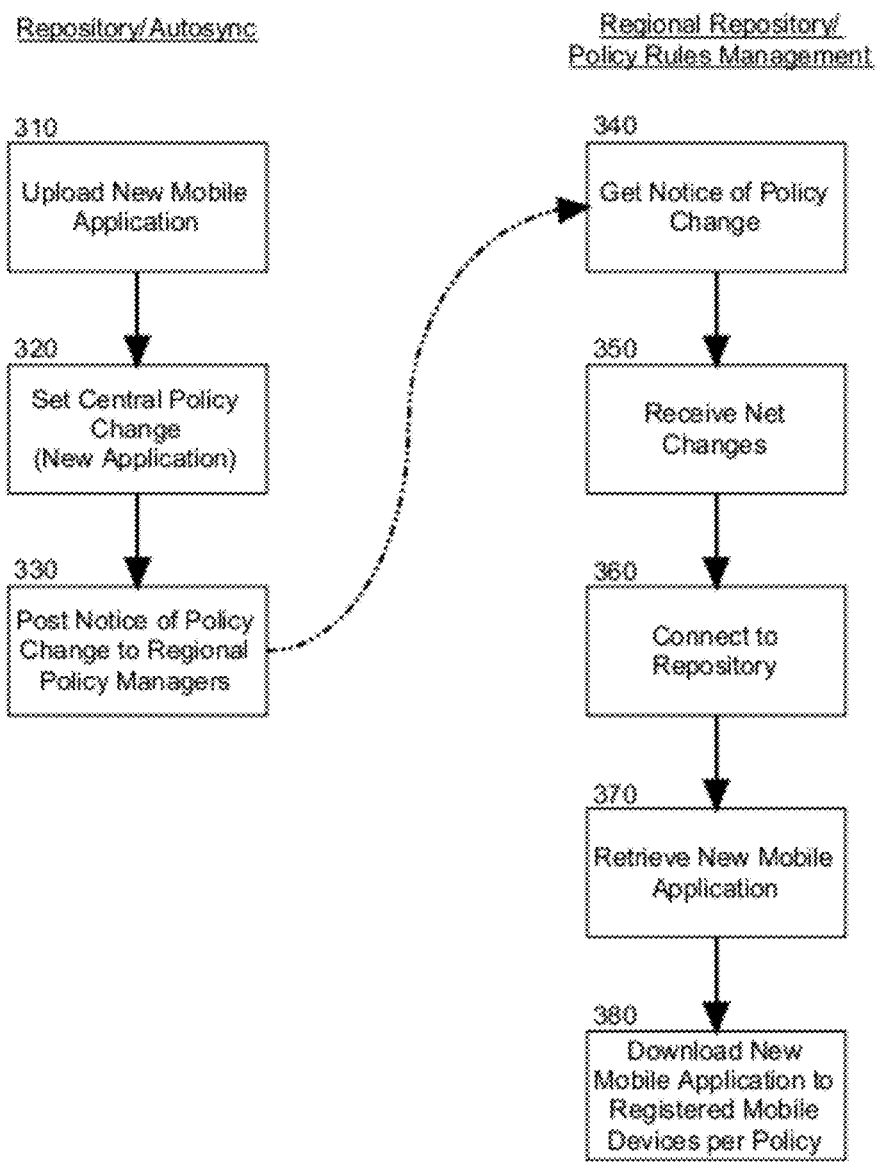

In yet further illustration of the operation of the auto-synchronization logic 300, FIG. 3 is a flow chart illustrating a process for mobile application deployment in a distributed computing environment. Beginning in block 310, a mobile application can be uploaded to a secure mobile application repository. In block 320, a distribution policy for the mobile applications disposed in the secure mobile application repository can be modified to account for the uploaded mobile application. For example, the distribution policy can be modified to specify an identity or classification of an end user permitted to receive deployment of the uploaded mobile application in a corresponding pervasive mobile device. As another example, the distribution policy can be modified to specify requisite computing resources in the corresponding pervasive mobile device for proper operation of the uploaded mobile application.

Once the distribution policy has been modified, in blocks 330 and 340, notice can be provided to the different rules management modules for the distributed application repositories of the change to the distribution policy. In response, in block 350 the changes to the distribution policy can be provided to each of the different rules management modules and in block 360, each of the different rules management modules can connect to the secure mobile application repository to retrieve the uploaded mobile application in block 370 into correspondingly coupled ones of the distributed application repositories. Finally, in block 380, the uploaded mobile application can be deployed from each of the distributed application repositories to communicatively linked pervasive mobile devices as permitted (or required) by the distribution policy.

As will be appreciated by one skilled in the art, aspects of the present invention may be embodied as a system, method or computer program product. Accordingly, aspects of the present invention may take the form of an entirely hardware embodiment, an entirely software embodiment or an embodiment combining software and hardware aspects that may all generally be referred to herein as a "circuit," "module" or "system." Furthermore, aspects of the present invention may take the form of a computer program product embodied in one or more non-transitory computer readable storage medium(s) having computer readable program code embodied thereon.

A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for mobile application deployment in a distributed computing environment, the method comprising:

uploading a mobile application into a secured central mobile application repository;

modifying a distribution policy for other mobile applications in the secured central mobile application repository to account for the uploaded mobile application and changes within the distribution policy; and, transmitting both the distribution policy and the uploaded mobile application to a distributed application repository by way of an intermediate server coupled to the secured distributed application repository, wherein the intermediate server is charged with synchronizing messages, calendaring and contacts with wirelessly linked pervasive mobile devices and an associated messaging server, the intermediate server selectively deploying the uploaded mobile application to different coupled mobile devices from the distributed application repository according to the distribution policy.

2. A mobile application deployment data processing system comprising:

a plurality of intermediate servers each separately programmed to synchronize messages, calendaring and contacts between wirelessly linked pervasive mobile devices and an associated messaging server;

a plurality of distributed mobile application repositories, each coupled to a different one of the intermediate servers;

a secure mobile application repository storing a plurality of applications and coupled to the distributed mobile application repositories over a computer communications network;

a distribution policy for the mobile applications; and auto-synchronization logic executing in memory of a computer coupled to the secure mobile application repository, the logic comprising program code enabled to transmit in response to detecting a change to the distribution policy, both the distribution policy and an uploaded mobile application to the distributed application repositories by way of the intermediate servers, wherein the change accounts for uploading at least one or more of the plurality of mobile applications to the secure mobile application repository and changes within the distribution policy.

3. The system of claim 2, wherein the secure mobile application repository and the plurality of distributed application repositories are disposed on opposite ends of a firewall.

4. The system of claim 2, further comprising an accessible interface to the secure mobile application repository providing access to a catalog of mobile applications in the secure mobile application repository from over the computer communications network.

5. A computer program product for mobile application deployment in a distributed computing environment, the computer program product comprising:

a computer readable storage device having computer readable program code embodied therewith, the computer readable program code comprising:

computer readable program code for uploading a mobile application into secured a central mobile application repository;

computer readable program code for modifying a distribution policy for other mobile applications in the secured central mobile application repository to account for the uploaded mobile application and changes within the distribution policy; and, computer readable program code for transmitting both the distribution policy and the uploaded mobile application to a distributed application repository by way of an intermediate server coupled to the distributed application repository, the intermediate server charged with synchronizing messages, calendaring and contacts with wirelessly linked pervasive mobile devices and an associated messaging server, the intermediate server selectively deploying the uploaded mobile application to different coupled mobile devices from the distributed application repository according to the distribution policy.

* * * * *